United States Patent
Terao et al.

(10) Patent No.: US 11,635,120 B2
(45) Date of Patent: Apr. 25, 2023

(54) SINTERED FRICTION MATERIAL FOR BRAKE

(71) Applicant: Sunstar Engineering Inc., Takatsuki (JP)

(72) Inventors: Hoshiaki Terao, Niigata (JP); Raita Wada, Niigata (JP); Tsuyoshi Nakatsuji, Takatsuki (JP); Yoshinori Shinagawa, Takatsuki (JP)

(73) Assignee: Sunstar Engineering Inc., Takatsuki (JP)

(*) Notice: Subject to any disclaimer, the term of this patent is extended or adjusted under 35 U.S.C. 154(b) by 803 days.

(21) Appl. No.: 16/492,850

(22) PCT Filed: Mar. 14, 2018

(86) PCT No.: PCT/JP2018/010083
§ 371 (c)(1),
(2) Date: Sep. 10, 2019

(87) PCT Pub. No.: WO2018/168968
PCT Pub. Date: Sep. 20, 2018

(65) Prior Publication Data
US 2020/0263750 A1    Aug. 20, 2020

(30) Foreign Application Priority Data

Mar. 14, 2017  (JP) .............................. JP2017-048855
Mar. 14, 2018  (JP) .............................. JP2018-046328

(51) Int. Cl.
| C09K 3/14 | (2006.01) |
| F16D 69/02 | (2006.01) |
| C22C 19/03 | (2006.01) |
| F16D 65/092 | (2006.01) |

(52) U.S. Cl.
CPC ............ *F16D 69/027* (2013.01); *C22C 19/03* (2013.01); *F16D 65/092* (2013.01); *F16D 2200/0008* (2013.01); *F16D 2200/0034* (2013.01); *F16D 2200/0052* (2013.01)

(58) Field of Classification Search
CPC ...... F16D 65/092; F16D 69/02; F16D 69/026; F16D 69/027; F16D 2200/0008; F16D 2200/0034; F16D 2200/0052; C09K 3/14; C09K 3/149

USPC ....... 188/73.1, 251 A, 251 M; 428/546–563, 428/569
See application file for complete search history.

(56) References Cited

U.S. PATENT DOCUMENTS

| 6,143,051 | A | 11/2000 | Ole et al. |
| 2018/0066168 | A1* | 3/2018 | Kamei ................. C22C 32/0005 |
| 2019/0011006 | A1* | 1/2019 | Dong .................... F16D 69/026 |
| 2019/0292634 | A1* | 9/2019 | Kubota ................ C22C 32/0021 |

FOREIGN PATENT DOCUMENTS

| JP | S6330617 A | 2/1988 |
| JP | 2516414 B2 | 7/1996 |
| JP | 2000345140 A | 12/2000 |
| JP | 2000345141 A | 12/2000 |
| JP | 2001032033 A | 2/2001 |
| JP | 2001501650 A | 2/2001 |
| JP | 4197751 B2 | 12/2008 |
| KR | 1020130088313 A | 8/2013 |

OTHER PUBLICATIONS

Itoh Takashi et al., Analysis of Packing Density by Randomly Packed Models of Binary Powders, Journal of the Japan Institute of Metals and Materials, 1986, pp. 475-479, vol. 50, No. 5.
Jun. 19, 2018, International Search Report issued in the International Patent Application No. PCT/JP2018/010083.
Feb. 3, 2020, the Extended European Search Report issued by the European Patent Office in the corresponding European Patent Application No. 18766981.7.

* cited by examiner

*Primary Examiner* — Christopher P Schwartz
(74) *Attorney, Agent, or Firm* — Kenja IP Law PC

(57) ABSTRACT

A sintered friction material for brake having a high friction coefficient, with which reduction of the friction coefficient is prevented at high temperature and stable brake performance is maintained. It comprises: a metal matrix of Ni or Ni+Fe (small amount); a solid lubricant (a); and a friction adjusting material (b) including: metal or alloy particles (b1) having an average particle size of 50 μm or more and containing at least one selected from W, Mo, Cr, and FeW; and inorganic particles (b2) containing at least one selected from oxides, nitrides, carbides, and intermetallic compounds. An average particle size $d_{b1}$ of b1 and an average particle size $d_{b2}$ of b2 satisfy $d_{b1}<d_{b2}$. Dispersing, in the metal matrix, b1 and b2 satisfying particular conditions as the friction adjusting material can produce a geometrical structure (particle structure with a high filling density) suitable for preventing plastic deformation of the sintered friction material.

15 Claims, No Drawings

SINTERED FRICTION MATERIAL FOR BRAKE

TECHNICAL FIELD

This disclosure relates to a metal-based sintered friction material for brake, in particular, to a friction material for brake suitable for a brake material of racing motorcycles.

BACKGROUND

Metal-based friction materials having metal or alloy as a matrix have high heat resistance at high temperature as compared with resin-based friction materials and thus, are used as brake materials (brake pads) of cars and motorcycles having high speed performance for race.

Racing motorcycles are necessary to be suddenly decelerated from the speed of, for example, 200 km/hr or more, and thus have a brake pad with temperature as high as 500° C. heated by frictional heat generated between the brake pad and an opponent material, a disc made of SUS. Further, recently, SUS materials having high heat resistance which can resist sudden deceleration from the speed of 300 km/hr or more have been commercialized, and thus the temperature of a brake pad may reach about 650° C. Therefore, there has been demand for a brake pad which can exhibit stable brake performance at such high temperature.

Metal-based friction materials are typically made of a sintered body obtained by dispersing a friction adjusting material (such as metal oxides and metal nitrides) and a solid lubricant (such as graphite and $CaF_2$) in a metal matrix and sintering it. Conventional metal-based friction materials use Cu as a part or a main component of a metal matrix, and to ensure heat resistance and mechanical strength, Cu is alloyed to enhance alloy strength by solid solution strengthening and strengthening by precipitation (for example, JP 2000-345140 A (PTL 1), JP 2000-345141 A (PTL 2), and JP 2516414 B (PTL 3)).

CITATION LIST

Patent Literatures

PTL 1: JP 2000-345140 A
PTL 2: JP 2000-345141 A
PTL 3: JP 2516414 B

Non-Patent Literature

NPL 1: T. Ito et. al, Analysis of Packing Density by Randomly Packed Models of Binary Powders, J. Japan Inst. Metals, Vol. 50, No. 5 (1986), pp. 475-479

SUMMARY

Technical Problem

However, conventional metal-based friction materials having Cu alloy as a metal matrix have proof stress and strength which are linearly reduced in accordance with the temperature rising are further significantly reduced at 400° C. to 500° C. Therefore, brake pads using such metal-based friction materials have a friction coefficient which is not significantly changed up to about 300° C. but significantly reduced at 300° C. or more, thus deteriorating the brake performance.

Further, a metal-based friction material of PTL 3 comprises, in a metal matrix made of Cu alloy, metal oxides having Mohs hardness of 4 or more and alloy iron such as FeW and FeMo to improve wear resistance and a friction coefficient, but in such a metal-based friction material, reduction of a friction coefficient cannot be sufficiently prevented in a high temperature range.

It could thus be helpful to provide a sintered friction material for brake having a high friction coefficient, with which reduction of the friction coefficient is prevented even in a high temperature range beyond 300° C., and stable brake performance is maintained, thus solving the problem of conventional techniques as described above.

Solution to Problem

The inventors made intensive studies to solve the above problem of metal-based friction materials, and found that (i) a high friction coefficient can be achieved, reduction in the friction coefficient is prevented in a high temperature range, and stable brake performance can be maintained by dispersing, in a metal matrix of Ni or Ni added with a few amount of Fe, a friction adjusting material comprising specific metal particles and inorganic particles optimized in particle size, and (ii) the high temperature stability of the high friction coefficient can be further improved by optimizing particle sizes of a friction adjusting material and a solid lubricant.

This disclosure has been made based on the above findings and primary features thereof are as described below.

[1] A sintered friction material for brake comprising: a metal matrix of Ni or Ni and less than 10 vol % Fe; a solid lubricant (a); and a friction adjusting material (b), wherein
the friction adjusting material (b) includes: metal or alloy particles (b1) having an average particle size of 50 μm or more and containing (consisting of) at least one selected from W, Mo, Cr, and FeW; and inorganic particles (b2) containing (consisting of) at least one selected from oxides, nitrides, carbides, and intermetallic compounds, and
the metal or alloy particles (b1) have an average particle size $d_{b1}$ and the inorganic particles (b2) have an average particle size $d_{b2}$, $d_{b1}$ and $d_{b2}$ satisfying $d_{b1} < d_{b2}$.

[2] The sintered friction material for brake according to [1], wherein the inorganic particles (b2) include two or more kinds of inorganic particles different in average particle size.

[3] The sintered friction material for brake according to [1] or [2], wherein the content of the friction adjusting material (b) is 20 vol % to 50 vol % and the content of the metal or alloy particles (b1) included in the friction adjusting material (b) is 1 vol % or more.

[4] The sintered friction material for brake according to any one of [1] to [3], wherein
the solid lubricant (a) contains graphite or graphite and $CaF_2$,
the graphite has an average particle size $d_c$ of 100 μm to 900 μm, where when the graphite includes two or more kinds of graphite different in average particle size, $d_c$ represents an average particle size of graphite having a largest average particle size,
the average particle size $d_c$ of the graphite and the average particle size $d_{b2}$ of the inorganic particles (b2) satisfy $d_c/d_{b2} \leq 1.3$, where when the graphite includes two or more kinds of graphite different in average particle size, $d_c$ represents an average particle size of graphite having a largest average particle size, and when the inorganic particles (b2) include two or more kinds of inorganic particles different in average particle size, $d_{b2}$ represents an average particle size of inorganic particles (b2) having a largest average particle size, and the content of the solid lubricant (a) is 30 vol % to 50 vol %.

[5] The sintered friction material for brake according to any one of [1] to [4], wherein when the metal or alloy particles (b1) include a single group of particles or two or more groups of particles different in average particle size, the inorganic particles (b2) include a single group of particles or two or more groups of particles different in average particle size, and the solid lubricant (a) includes a single group of particles or two or more groups of particles different in average particle size, the sintered friction material has a volume ratio of $v_L/v$ of 0.5 to 0.9, where $v_L$ represents a total volume of particles having an average particle size of 200 µm or more among the single or two or more groups of particles in the metal or alloy particles (b1), the inorganic particles (b2), and the solid lubricant (a), and v represents a total volume of the metal or alloy particles (b1), the inorganic particles (b2), and the solid lubricant (a).

[6] The sintered friction material for brake according to any one of [1] to [5], wherein the inorganic particles (b2) included in the friction adjusting material (b) have Mohs hardness of less than 9.

[7] A brake pad comprising the sintered friction material according to any one of [1] to [6].

Advantageous Effect

Our sintered friction material for brake has a high friction coefficient, reduction of which is prevented even in a high temperature range beyond 300° C., and thus has high temperature stability of the friction coefficient by which stable brake performance can be maintained.

DETAILED DESCRIPTION

Our sintered friction material is a sintered body (solid-phase sintered body) comprising: a metal matrix of Ni (with the balance being inevitable impurities) or Ni and less than 10 vol % Fe (with the balance being inevitable impurities); a solid lubricant (a); and a friction adjusting material (b).

Our sintered friction material has primary features in that it has a high friction coefficient, reduction of which is prevented even at high temperature, and thus has high temperature stability by a combination of (i) the metal matrix contains Ni or Ni+Fe (small amount) and (ii) the friction adjusting material (b) includes metal particles (b1) and inorganic particles (b2) satisfying a specific condition.

As described above, conventional metal-based friction materials use Cu as a part or a main component of a metal matrix, and to ensure heat resistance and mechanical strength, Cu is alloyed to enhance alloy strength by solid solution strengthening and strengthening by precipitation. For example, metal-based friction materials of PTL 1 to PTL 3 are added with Zn, Sn, Ni, W, and Fe as alloying elements of a metal matrix to thereby strengthen the metal matrix by virtue of solid solution strengthening and strengthening by precipitation. However, metal-based friction materials having a metal matrix made up of Cu alloy have a friction coefficient which is significantly reduced due to the deterioration of proof stress and strength in a high temperature range such as beyond 300° C., thus deteriorating the brake performance.

In racing motorcycles, a brake pad may have temperature of about 650° C., and thus a metal-based friction material applied to such a brake pad is required to have a friction coefficient which is prevented from being reduced up to high temperature of about 650° C. and maintain the brake performance. Therefore, it is important that a metal matrix can firmly fix a friction adjusting material and a solid lubricant, and in order that a metal matrix has such a function, a metal matrix preferably has high heat resistance, strength hardly decreased even at high temperature, and low hardness. As a metal matrix satisfying such conditions, this disclosure uses Ni or Ni added with a small amount of Fe. Ni has high oxidation resistance and strength which is hardly decreased from normal temperature to about 650° C. as compared with Cu alloy. Additionally, Ni is as very soft as Vickers hardness of about 100, thus having high ductility. Therefore, Ni is changed little in its strength and hardness even if the brake pad temperature is increased. Moreover, Ni forms a stable oxide film to hardly generate adhesion to a disc made of SUS which is an opposite material of a brake pad. Further, Ni is soft and has high plastic workability (plastic deformability). Thus, even when wear proceeds, gaps hardly occur between Ni and a friction adjusting material or a solid lubricant, and such materials can be fixed. From the aforementioned points, a metal matrix containing Ni can maintain high adhesion to particles of a friction adjusting material and a solid lubricant.

Further, Fe is also soft, and has plastic workability, higher heat resistance than Cu, higher rigidity and heat resistance than Ni. Therefore, the substitution of Fe for a part of pure Ni can further improve the high temperature stability of the friction coefficient. However, Fe is more easily oxidized than Ni. When Fe is oxidized, ductility of a metal matrix is reduced, causing a friction adjusting material and a solid lubricant to fall off. When the substitution ratio of Fe is 10 vol % or more, such a problem may come to the surface and thus, adhesion to an opposite material is easily generated, deteriorating mechanical properties at high temperature. Therefore, when a metal matrix contains Fe, the content of Fe is less than 10 vol % and preferably less than 3 vol %.

The metal matrix made of soft metal (Ni or Ni added with a small amount of Fe) is formed by subjecting fine powder having a size of about several micrometers to solid-phase sintering. The entire solid-phase sintered body has about 5 vol % to 30 vol % pore. The pores and the soft metal, which serve as a cushioning material when the contact with an opposite material causes compressive stress, increase an area contacting with an opponent material to thereby increase a friction coefficient.

To make the metal matrix having high plastic deformability, Ni and Fe used in the metal matrix suitably have a particle size of 10 µm or less.

The solid lubricant (a) forms a lubricating film between the sintered friction material (the brake pad) and an opponent material, a disc made of SUS to prevent wear of the sintered friction material and provide steady wear condition on the sintered friction material. The solid lubricant (a) includes graphite, molybdenum disulfide, boron nitride, $CaF_2$, $BaF_2$, and graphite fluoride, and at least one of them can be used, but among them, graphite is preferable. In addition, $CaF_2$ exhibits stable lubrication performance in a high temperature range. Therefore, to improve lubrication performance at high temperature, an appropriate amount of $CaF_2$ is preferably used with graphite. The graphite may be artificial graphite or natural graphite.

The friction adjusting material (b) is comprised in the sintered friction material to (i) prevent plastic deformation of the sintered friction material caused by decrease in yield point of the metal matrix at high temperature, (ii) ensure rigidity of the sintered friction material corresponding to a disc made of SUS having high hardness which is an opponent material, and (iii) provide steady wear condition on the sintered friction material at high temperature.

The friction adjusting material (b) includes: metal or alloy particles (b1) having an average particle size of 50 μm comprising at least one selected from W, Mo, Cr, FeW (ferro-tungsten) (hereinafter, referred to as "metal particles (b1)" for convenience of explanation); and inorganic particles (b2) including at least one selected from oxides, nitrides, carbides, and intermetallic compounds, the metal particles (b1) and the inorganic particles (b2) having different average particle sizes. In particular, the average particle size $d_{b1}$ of the metal particles (b1) and the average particle size $d_{b2}$ of the inorganic particles (b2) preferably satisfy $d_{b1} < d_{b2}$. Further, the inorganic particles (b2) preferably include two or more kinds of inorganic particles different in average particle size.

Some conventional metal-based friction materials have a metal matrix containing Cu as a main component and a small amount of W and Mo. W and Mo contained as a metal matrix are very fine metal particles having a particle size of several micrometers. Such fine W and Mo are added to thereby obtain strengthening by precipitation of a metal matrix (Cu alloy). On the other hand, the metal particles (b1) comprised as the friction adjusting material (b) in this disclosure (at least one of metal particles such as W and Mo, and FeW particles), which are coarse particles having an average particle size of 50 μm or more, cooperate with the inorganic particles (b2) having an average particle size different from the average size of the metal particles to effectively prevent plastic deformation of the sintered friction material at high temperature. This action will be described in detail later.

When the metal particles (b1) comprises FeW (ferro-tungsten), the content of W is not particularly limited, but to make the specific gravity of FeW particles high, the content of W is preferably about 70 mass % to 85 mass %.

W, Mo, and Cr which are the metal particles (b1) are metal having high specific gravity (W: 19.3, Mo: 10.2, and Cr: 7.2). FeW is also alloy having high specific gravity (for example, the specific gravity of FeW is 17.4 when the content of W is 78 mass %). The metal particles (b1) which have thus high specific gravity and are coarse (the average particle size is 50 μm or more) have high adhesion to the metal matrix (not easily falling off) and high functionality of preventing plastic deformation of the sintered friction material. Commonly and widely used W and Mo powder has a particle size of about several micrometers (including W and Mo added to conventional metal-based friction materials as a part of a metal matrix), and thus coarse W and Mo particles used as the metal particles (b1) in this disclosure are considered to have a special particle size. The metal particles (b1) include particles made by aggregating metal powder or alloy powder and sintering it to make coarse particles.

The coarse metal particles (b1) having high specific gravity which are comprised as a part of the friction adjusting material (b) in the sintered friction material in this disclosure have the following function and properties as the friction adjusting material.

(1) The friction adjusting material comprising metal particles (including alloy particles (the same applies hereinafter)) is easily joined to the metal matrix and dispersed in it. In particular, the friction adjusting material has high adhesion at high temperature, not easily falling off at high temperature.

(2) The inorganic particles often have irregular angular shapes and easily generate a gap between the inorganic particles and the metal matrix. Further, the inorganic particles tend to have poor adhesion to the metal matrix, thus easily falling off. On the other hand, even metal particles with uneven irregular shapes have high adhesion to the metal matrix as compared with the inorganic particles, thus not easily falling off.

(3) Because the metal particles have high specific gravity (in particular, W and FeW have high specific gravity) and are coarse, the metal particles have a high anchor effect and thus have a high effect of preventing plastic deformation of the sintered friction material.

When the metal particles (b1) have an average particle size of less than 50 μm, the effect of preventing plastic deformation of the sintered friction material produced by the metal particles which have high specific gravity and are coarse is decreased. Additionally, the difference between the average particle size of the metal particles (b1) and the average particle size of the inorganic particles (b2) becomes large, and thus, the effect of preventing plastic deformation produced by the geometrical structure constituted of the metal particles (b1) and the inorganic particles (b2) (and in addition to them, the solid lubricant (a)) (particle structure with a high filling density) is also decreased. Further, the action of causing precipitation hardening of the metal matrix works and thus, the "metal matrix which has high heat resistance and are soft, exhibiting high plastic workability" which is the feature of this disclosure cannot be obtained.

Oxides, nitrides, carbides (typically, metal oxides, metal nitrides, and metal carbides) and intermetallic compounds which are the inorganic particles (b2) include alumina, silica, mullite, zirconium silicate, silicon nitride, silicon carbide, titanium boride, titanium nitride, $Ti_3Al$, $Fe_3Al$, glass, iron oxide, at least one of which can be used.

To enhance the effect of preventing plastic deformation of the sintered friction material produced by the geometrical structure constituted of the metal particles (b1) and the inorganic particles (b2) (and in addition to them, the solid lubricant (a)) (particle structure with a high filling density), the average particle size $d_{b1}$ of the metal particles (b1) and an the average particle size $d_{b2}$ of the inorganic particles (b2) preferably satisfy $d_{b1} < d_{b2}$, and further, the inorganic particles (b2) preferably include two or more kinds, desirably, three or more kinds of inorganic particles different in average particle size. Further, for the same reason, the average particle size of the inorganic particles (b2) is preferably 100 μm or more.

When the inorganic particles (b2) dispersed in the metal matrix has high hardness, uneven wear of the sintered friction material (brake pad) is easily caused. Thus, to prevent uneven wear of the sintered friction material, the inorganic properties (b2) preferably have Mohs hardness of less than 9.

That is, when the inorganic properties (b2) are hard (having Mohs hardness of 9 or more), the particles are not easily crushed, and thus fall off without being crushed during use of the brake pad, easily causing uneven wear of the sintered friction material (brake pad). Alumina, silicon nitride, silicon carbide, titanium boride, and titanium nitride are particularly hard, and thus are unsuitable for preventing uneven wear of the sintered friction material. On the other hand, particles having Mohs hardness of less than 9 are gradually crushed during use of the brake pad to leave a friction surface. Thus, such particles do not fall off before they are crushed, not easily cause uneven wear of the sintered friction material (brake pad).

The inorganic particles (b2) having Mohs hardness of less than 9 include silica, zirconium silicate, mullite, glass, and iron oxide, at least one of which can be used.

In the metal matrix containing Ni or Ni+Fe (small amount) of our sintered friction material, the metal particles (b1) and the inorganic particles (b2) satisfying particular conditions as the friction adjusting material (b) are dispersed, thereby producing the following action and effect.

The metal particles (b1) which have high specific gravity and are coarse (having an average particle size of 50 μm or more) have functions and properties as described in the aforementioned (1) to (3). Such coarse metal particles (b1) and coarse inorganic particles (b2) which are different from the metal particles (b1) in average particle size (preferably, the inorganic particles (b2) having a larger average particle size than that of the metal particles (b1)) are added together to thereby obtain a geometrical structure (particle structure with a high filling density) which is suitable for preventing plastic deformation of the sintered friction material. That is, the metal particles (b1) and the inorganic particles (b2) which are different in average particle size have relatively wide particle size distribution to thereby achieve high filling density in the metal matrix. As the result, the effect of preventing plastic deformation of the sintered friction material is increased, and thus a sintered friction material can be obtained which has a high friction coefficient and high temperature stability of the friction coefficient by which a friction coefficient is prevented from being reduced even at high temperature. When the average particle size $d_{b1}$ of the metal particles (b1) and the average particle size $d_{b2}$ of the inorganic particles (b2) satisfy $d_{b1} < d_{b2}$, and the inorganic particles (b2) include two or more kinds of inorganic particles (desirably, three or more kinds of inorganic particles) which are different in average particle size, the aforementioned effect is further increased.

That is, the rigidity of the sintered friction material is supported by the geometrical structure of the friction adjusting material (b) including the metal particles (b1) and the inorganic particles (b2), and the friction adjusting material (b) and the brittle solid lubricant (a) are stuck with the soft metal matrix. Further, the solid lubricant (a) and the friction adjusting material (b) have heat resistance to withstand as high temperature as about 650° C. Thus, the geometrical structure constituted of those particles having heat resistance (particle structure with a high filling density) is stuck to the metal matrix containing Ni or Ni+Fe (small amount) having high heat resistance to ensure high heat resistance, and rigidity and strength of the entire sintered friction material. On a contact surface of the sintered friction material to its opponent material, a soft metal matrix having pores obtained by subjecting fine powder having as small a size as about several micrometers to solid-phase sintering serves as a cushioning material when the contact with the opposite material causes compressive stress. Additionally, the metal matrix has high plastic deformability, which prevents gaps from occurring between the metal matrix and the friction adjusting material (b) and the solid lubricant (a) while high frictional force is applied to the sintered friction material, and thus, the metal matrix is firmly stuck with the friction adjusting material (b) and the solid lubricant (a) to thereby prevent them from falling off, thus producing a stable high friction coefficient and reducing the wear amount.

Fe contained in the metal matrix adequately perform the aforementioned function of the metal matrix when Fe is not a large particle such as atomized iron powder and reduced iron powder typically used for powder metallurgy but a particle having a particle size of 10 μm or less (typically, several micrometers) such as carbonyl iron.

The following describes preferable conditions in this disclosure.

First, as more preferable particle size conditions of the metal particles (b1) and the inorganic particles (b2), the average particle size of the metal particles (b1) is 50 μm to 150 μm, the average particle size of the inorganic particles (b2) is 100 μm to 700 μm, and the average particle size $d_{b1}$ of the metal particles (b1) and the average particle size $d_{b2}$ of the inorganic particles (b2) preferably satisfy $d_{b1} < d_{b2}$, thereby further increasing the effect of preventing plastic deformation of the sintered friction material. Specifically, the friction adjusting material (b) including the metal particles (b1) and the inorganic particles (b2) moderately different in average particle size has wide particle size distribution, and thus produces particularly high filling density in the metal matrix. As the result, the effect of preventing plastic deformation of the sintered friction material can be further increased. Therefore, a higher friction coefficient can be obtained and the high temperature stability of the friction coefficient is further improved.

When the metal particles (b1) have an average particle size beyond 150 μm, the difference between the average particle size of the metal particles (b1) and the average particle size of the inorganic particles (b2) becomes small, and when the inorganic particles (b2) have an average particle size beyond 700 μm, the difference between the average particle size of the metal particles (b1) and the average particle size of the inorganic particles (b2) becomes large. In such cases, the effect of preventing plastic deformation of the sintered friction material produced by the geometrical structure constituted of the metal particles (b1) and the inorganic particles (b2) (additionally, the solid lubricant (a)) (particle structure with a high filling density) may be decreased.

The content of the metal matrix in the sintered friction material is preferably about 20 vol % to 40 vol %. The metal matrix is required to be contained at least in an amount necessary to firmly fix the geometrical structure constituted of the friction adjusting material (b) and the solid lubricant (a). Thus, the content of the metal matrix is preferably 20 vol % or more. In particular, the metal matrix of Ni or Ni+Fe (small amount) has high plastic deformability, and easily fixes the friction adjusting material and the solid lubricant as compared with Cu alloy. To utilize such priorities, the content of the metal matrix is preferably 20 vol % or more. On the other hand, when the content of the metal matrix is too large, the rigidity of the sintered friction material is decreased to increase the friction amount. Thus, the content of the metal matrix is preferably 40 vol % or less.

The content of the solid lubricant (a) in the sintered friction material is preferably about 30 vol % to 50 vol %. When the content of the solid lubricant (a) is less than 30 vol %, the lubrication effect may be inadequate. On the other hand, the content of the solid lubricant (a) is beyond 50 vol %, the strength and rigidity of the sintered friction material may be decreased. When the solid lubricant (a) contains graphite and $CaF_2$, the content of $CaF_2$ is preferably about 3 vol % to 10 vol %. When the content of $CaF_2$ is less than 3 vol %, the effect of adding $CaF_2$ is inadequate. On the other hand, the content of the $CaF_2$ is beyond 10 vol %, the strength and rigidity of the sintered friction material may be decreased.

The content of the friction adjusting material (b) in the sintered friction material is preferably about 20 vol % to 50 vol %. When the content of the friction adjusting material (b)

is less than 20 vol %, the effect produced by the friction adjusting material as described above may be inadequate. On the other hand, when the content of the friction adjusting material (b) is beyond 50 vol %, the ratio of the metal matrix is decreased, and thus the action of fixing the solid lubricant (a) and the friction adjusting material (b) by the metal matrix may be deteriorated.

Further, the content of the metal particles (b1) included in the friction adjusting material (b) is preferably 1 vol % or more. When the content of the metal particles (b1) is less than 1 vol %, the effect of adding the metal particles (b1) and adding the metal particles (b1) in combination with the inorganic particles (b2) may be inadequate. On the other hand, when the content of the metal particles (b1) is too large, the ratio of the inorganic particles (b2) is decreased, and thus the rigidity and strength of the sintered friction material may be decreased. Therefore, the contents of the metal particles (b1) and the inorganic particles (b2) preferably satisfy the content of the metal particles (b1)<the content of the inorganic particles (b2).

Further, when the solid lubricant (a) contains graphite or graphite+$CaF_2$, it is preferable to optimize the average particle size of the graphite and the relationship between the average particle size of the graphite and the average particle size of the inorganic particles (b2). That is, graphite has smaller specific gravity than other components (such as the friction adjusting material), and thus when the particle size of graphite is small, graphite splatters when mixed with other components and easily incurs segregation. Further, graphite is crushed during mixing to become fine. Therefore, to form a stable structure of components, graphite having a particle size of 100 μm or more (preferably, about several hundred micrometers) is preferably used. Such graphite having a large particle size is preferable because of its excellent lubrication performance. When graphite to be used has a large particle size and low strength, such graphite would be easily crushed without a friction adjusting material having a size corresponding to the particle size of the graphite, and thus stable lubrication performance would not be obtained. Further, the geometrical structure having high rigidity constituted of the solid lubricant (a) and the friction adjusting material (b) (particle structure with a high filling density) would not function sufficiently.

Therefore, the average particle size $d_c$ of the graphite (when the graphite includes two or more kinds of graphite different in average particle size, $d_c$ is the average particle size of graphite having the largest average particle size) is preferably 100 μm to 900 μm. Additionally, the average particle size $d_c$ of graphite (when the graphite includes two or more kinds of graphite different in average particle size, $d_c$ is the average particle size of graphite having the largest average particle size) and the average particle size $d_{b2}$ of the inorganic particles (b2) (when the inorganic particles (b2) include two or more kinds of inorganic particles (b2) different in average particle size, $d_{b2}$ represents the average particle size of inorganic particles (b2) having the largest average particle size) preferably satisfy $d_c/d_{b2} \leq 1.3$. When the average particle size of the graphite is beyond 900 μm, it becomes difficult for the metal matrix to hold the graphite, thus easily deteriorating the performance of the sintered friction material.

Further, by mixing two particle (powder) groups different in particle size in a specific ratio, it is known that filling ability of powder is improved (for example, NPL 1). When the ratio $v_0/v_t$ of a volume $v_0$ of one particle group having a larger particle size and a total volume $v_t$ of two particle groups is about 0.72, the filling density is considered to become highest. Therefore, to obtain a sintered friction material having high rigidity, a high friction coefficient, and high temperature stability of the friction coefficient, it is preferable to obtain a high filling density by combining powder (powder) groups different in average particle size in adding the solid lubricant (a) and the friction adjusting material (b). Consequently, when the metal particles (b1) include a single group of particles (powder) or two or more groups of particles (powder) different in average particle size, the inorganic particles (b2) include a single group of particles (powder) or two or more groups of particles (powder) different in average particle size, and the solid lubricant (a) includes a single group of particles (powder) or two or more groups of particles (powder) different in average particle size, the volume ratio of $v_L/v$ is preferably 0.5 to 0.9, and more preferably 0.6 to 0.9, where $v_L$ is a total volume of particles having an average particle size of 200 μm or more among the single or two or more groups of particles in the metal or alloy particles (b1), the inorganic particles (b2), and the solid lubricant (a), and v is a total volume of the metal particles (b1), the inorganic particles (b2), and the solid lubricant (a).

In this disclosure, the average particle size of each of the solid lubricant (a), the metal particles (b1), and the inorganic particles (b2) are determined as follows. Specifically, a cross section of the sintered friction material (in an arbitrary position) is magnified and observed with an electron microscope (field: 2 mm×2.5 mm, about 50 magnifications). 20 samples of each component particle projected on the observed image are arbitrarily selected (when 20 samples cannot be extracted from one field, two fields are observed) to measure the major axis length of a particle in each sample and average major axis lengths of 20 samples to determine an average particle size.

Further, in this disclosure, when two or more kinds of metal particles different in average particle size are used as the metal particles (b1), the average particle size of the metal particles (b1) is obtained by calculating a weighted average of average particle diameters of the two or more kinds of metal particles depending on their volume unless otherwise specified. Similarly, when two or more kinds of inorganic particles different in average particle size are used as the inorganic particles (b2), the average particle size of the inorganic particles (b2) is obtained by calculating a weighted average of average particle diameters of the inorganic particles depending on their volume unless otherwise specified.

Our sintered friction material for brake, which is applied to a brake pad, is particularly suitable for a brake material of racing motorcycles.

For example, our sintered friction material can be manufactured as follows. Specifically, metal powder for the metal matrix (Ni powder or Ni powder+Fe powder), powder of the solid lubricant (a), and powder of the friction adjusting material (b) (the metal particles (b1) and the inorganic particles (b2)) are mixed in a mixer. The mixed powder is formed into a predetermined shape with pressure of about 200 MPa to 600 MPa, and subsequently, the formed body is placed on a steel sheet (core material) coated with Cu and subjected to sintering (solid-phase sintering) for about 20 minutes to 240 minutes at temperature of 700° C. to 1100° C. with pressure of 5 MPa to 20 MPa under reductive atmosphere. The sintered body is optionally subjected to processing such as surface grinding to obtain a sintered friction material to be applied to a brake pad.

EXAMPLES

Powder of each component listed in Tables 1, 3, and 5 was mixed in a mixer. The mixed powder was formed into a predetermined shape with pressure of 380 MPa, and subsequently, the formed body was put on a steel sheet (core material) coated with Cu and subjected to sintering for 60 minutes under conditions of pressure of 8.4 MPa and at temperature of 900° C. under reductive atmosphere to obtain sintered friction materials of examples and a comparative example. The comparative example is a sintered friction material not containing a friction adjusting material corresponding to the metal particles (b1) of this disclosure. Tables 1, 3, and 5 list a mix proportion (vol %) of each component comprised in a sintered friction material and a porosity ratio (vol %) of a sintered friction material. The mix proportion of each component is a ratio in a volume of a sintered friction material excluding pores.

Sintered friction materials processed into a brake pad were subjected to a braking test. Specifically, stainless steel was used an opponent material, and the brake pads were sufficiently rubbed (brake initial velocity: 65 km/h, brake terminal velocity: 0 km/h, inertia: 19.6 kgm$^2$, deceleration: 3 m/s$^2$, pad temperature before braking: 120° C., the number of braking: 100), and subsequently subjected to a braking test with brake initial velocity of 162 km/h, and brake terminal velocity of 50 km/h to measure a friction coefficient and a wear amount. Test conditions were as follows: effective diameter of a disc: 310 mm, pad shape: 70 mm in length, 30.5 mm in width, 20.6 cm$^2$ in area. Further, inertia was 19.6 kgm$^2$, deceleration was 4.6 m/s$^2$, pad temperature before braking was 100° C., 200° C., 300° C., 400° C., and 500° C., and the number of braking was 50. As an average friction coefficient, an average value of 40 to 50 braking was adopted. For the pad wear, a value after the test including rubbing was adopted. The test results are listed in Tables 2, 4, and 6.

As listed in Tables 2, 4, and 6, in the examples as compared with the comparative example, the reduction amount and reduction rate of the friction coefficient are small at high temperature, the high temperature stability of the friction coefficient is excellent, and uneven wear is significantly prevented. In Example 3, which does not comprise Fe in the metal matrix, the high temperature stability of the friction coefficient is low as compared with Examples 1 and 2. In Example 2, which has graphite with an average particle size of 800 μm and $d_c/d_{b2} \leq 2.0$, the high temperature stability of the friction coefficient is slightly low as compared with Example 1.

TABLE 1

| | | | Example 1 | | Example 2 | | Example 3 | | Comparative Example | |
|---|---|---|---|---|---|---|---|---|---|---|
| | Kinds of powder | | Average particle size (μm) | Mixing ratio (vol %) | Average particle size (μm) | Mixing ratio (vol %) | Average particle size (μm) | Mixing ratio (vol %) | Average particle size (μm) | Mixing ratio (vol %) |
| Metal matrix | Nickel | | **1 | 30.1 | **1 | 30.1 | **1 | 30.9 | **1 | 31 |
| | Iron | | **1 | 0.9 | **1 | 0.9 | — | 0 | **1 | 1 |
| Solid lubricant | Graphite (artificial) | | 500 | 30.5 | 800 | 30.5 | 500 | 30.5 | 350 | 36 |
| | Graphite (natural) | | 300 | 7.6 | 300 | 7.6 | 300 | 7.6 | — | 0 |
| | Calcium fluoride | | 150 | 5.5 | 150 | 5.5 | 150 | 5.5 | 150 | 4 |
| Friction adjusting material | Tungsten (metal particles) | | 100 | 4.3 | 100 | 4.3 | 100 | 4.3 | 15 or less | 1 |
| | Inorganic particles | Silica | 400 | 8.8 | 400 | 8.8 | 400 | 8.8 | — | 0 |
| | | Mullite | 250 | 7.3 | 250 | 7.3 | 250 | 7.3 | 220 | 10 |
| | | Zirconium silicate | 125 | 4.9 | 125 | 4.9 | 125 | 4.9 | 180 | 12 |
| | | Titanium boride | — | 0 | — | 0 | — | 0 | 100 | 5 |
| $d_c/d_{b2}$ *1 | | | | 1.25 | | 2.00 | | 1.25 | | — |
| $v_L/v$ *2 | | | | 0.79 | | 0.79 | | 0.79 | | — |
| Porosity (vol %) *3 | | | | 9.4 | | 13.0 | | 12.1 | | 17.0 |

*1 An average particle size ratio of an average particle size $d_c$ of graphite (when graphite includes two or more kinds of graphite different in average particle size, $d_c$ represents an average particle size of graphite having a largest average particle size) to an average particle size $d_{b2}$ of inorganic particles (when inorganic particles include two or more kinds of inorganic particles different in average particle size, $d_{b2}$ represents an average particle size of inorganic particles having a largest average particle size)
*2 A volume ratio of a total volume $v_L$ of powder particles having an average particle size of 200 μm or more among powder particles in a friction adjusting material and a solid lubricant to a total volume $v$ of a friction adjusting material and a solid lubricant
*3 Porosity is defined from the oil content of a wear material.
**1 Powder particles having a particle size of less than 10 μm

TABLE 2

| | | | Example 1 | | Example 2 | | Example 3 | | Comparative Example | |
|---|---|---|---|---|---|---|---|---|---|---|
| | | | Pad temperature (° C.) | Average friction coefficient | Pad temperature (° C.) | Average friction coefficient | Pad temperature (° C.) | Average friction coefficient | Pad temperature (° C.) | Average friction coefficient |
| Average friction coefficient | Pad temperature before braking | 100° C. #1 | 310 | 0.64 | 314 | 0.70 | 322 | 0.64 | 294 | 0.68 |
| | | 200° C. #2 | 383 | 0.68 | 380 | 0.69 | 403 | 0.66 | 376 | 0.69 |
| | | 300° C. #3 | 456 | 0.65 | 468 | 0.67 | 473 | 0.62 | 458 | 0.67 |
| | | 400° C. #4 | 531 | 0.57 | 540 | 0.63 | 530 | 0.57 | 534 | 0.60 |
| | | 500° C. #5 | 608 | 0.55 | 600 | 0.59 | 603 | 0.52 | 616 | 0.51 |
| | Average value of average friction coefficients of #1 to #5 | | — | 0.62 | — | 0.66 | — | 0.60 | — | 0.63 |
| Reduction degree of the friction coefficient at high temperature | Reduction amount of the average friction coefficient from 100° C. to 500° C. of the pad temperature before braking | | | 0.09 | | 0.11 | | 0.12 | | 0.17 |

TABLE 2-continued

|  | | Example 1 | | Example 2 | | Example 3 | | Comparative Example | |
|---|---|---|---|---|---|---|---|---|---|
|  | | Pad temperature (° C.) | Average friction coefficient | Pad temperature (° C.) | Average friction coefficient | Pad temperature (° C.) | Average friction coefficient | Pad temperature (° C.) | Average friction coefficient |
|  | Reduction rate (%) of the average friction coefficient from 100° C. to 500° C. of the pad temperature before braking | 14.1 | | 15.5 | | 19.2 | | 24.5 | |
| Pad wear | Wear amount (mm) | 0.97 | | 0.74 | | 1.05 | | 1.09 | |
|  | Uneven wear amount in the diameter direction (mm) | 0.06 | | 0.11 | | — | | 0.21 | |

TABLE 3

|  | | | Example 4 | | Example 5 | | Example 6 | | Example 7 | |
|---|---|---|---|---|---|---|---|---|---|---|
|  | Kinds of powder | | Average particle size (μm) | Mixing ratio (vol %) | Average particle size (μm) | Mixing ratio (vol %) | Average particle size (μm) | Mixing ratio (vol %) | Average particle size (μm) | Mixing ratio (vol %) |
| Metal matrix | Nickel | | **1 | 21.7 | **1 | 30.1 | **1 | 29.8 | **1 | 30.1 |
|  | Iron | | **1 | 9.8 | **1 | 1.0 | **1 | 0.9 | **1 | 0.9 |
| Solid lubricant | Graphite (artificial) | | 500 | 30.1 | 500 | 31.6 | 500 | 27.1 | 500 | 30.5 |
|  | Graphite (natural) | | 300 | 7.5 | 300 | 7.8 | 300 | 6.8 | 300 | 7.6 |
|  | Calcium fluoride | | 150 | 5.5 | 150 | 5.8 | 150 | 4.9 | 150 | 5.5 |
| Friction adjusting material | Tungsten (metal particles) | | 100 | 4.7 | 100 | 8.1 | 100 | 1.0 | 60 | 4.3 |
|  | Inorganic particles | Silica | 400 | 8.7 | 400 | 6.6 | — | 0 | 400 | 8.8 |
|  |  | Mullite | 250 | 7.2 | 250 | 5.8 | 250 | 15.7 | 250 | 7.3 |
|  |  | Zirconium silicate | 125 | 4.8 | 125 | 3.2 | 125 | 13.8 | 125 | 4.9 |
| $d_c/d_{b2}$ *1 | | | | 1.25 | | 1.25 | | 2.00 | | 1.25 |
| $v_L/v$ *2 | | | | 0.78 | | 0.75 | | 0.72 | | 0.79 |
| Porosity (vol %) *3 | | | | 12.1 | | 11.8 | | 8.8 | | 10.3 |

*1 An average particle size ratio of an average particle size $d_c$ of graphite (when graphite includes two or more kinds of graphite different in average particle size, $d_c$ represents an average particle size of graphite having a largest average particle size) to an average particle size $d_{b2}$ of inorganic particles (when inorganic particles include two or more kinds of inorganic particles different in average particle size, $d_{b2}$ represents an average particle size of inorganic particles having a largest average particle size)
*2 A volume ratio of a total volume $v_L$ of powder particles having an average particle size of 200 μm or more among powder particles in a friction adjusting material and a solid lubricant to a total volume $v$ of a friction adjusting material and a solid lubricant
*3 Porosity is defined from the oil content of a wear material.
**1 Powder having a particle size of less than 10 μm

TABLE 4

|  | | | Example 4 | | Example 5 | | Example 6 | | Example 7 | |
|---|---|---|---|---|---|---|---|---|---|---|
|  | | | Pad temperature (° C.) | Average friction coefficient | Pad temperature (° C.) | Average friction coefficient | Pad temperature (° C.) | Average friction coefficient | Pad temperature (° C.) | Average friction coefficient |
| Average friction coefficient | Pad temperature before braking | 100° C. #1 | 308 | 0.56 | 340 | 0.55 | 336 | 0.58 | 340 | 0.51 |
|  |  | 200° C. #2 | 375 | 0.56 | 417 | 0.56 | 390 | 0.65 | 400 | 0.54 |
|  |  | 300° C. #3 | 440 | 0.56 | 488 | 0.57 | 465 | 0.70 | 461 | 0.58 |
|  |  | 400° C. #4 | 509 | 0.52 | 557 | 0.56 | 534 | 0.65 | 532 | 0.70 |
|  |  | 500° C. #5 | 596 | 0.54 | 614 | 0.52 | 607 | 0.59 | 594 | 0.69 |
|  | Average value of average friction coefficients of #1 to #5 | | — | 0.55 | — | 0.55 | — | 0.64 | — | 0.60 |
| Reduction degree of the friction coefficient at high temperature | Reduction amount of the average friction coefficient from 100° C. to 500° C. of the pad temperature before braking | | 0.02 | | 0.03 | | −0.01 | | −0.18 | |
|  | Reduction rate (%) of the average friction coefficient from 100° C. to 500° C. of the pad temperature before braking | | 4.3 | | 6.0 | | −2.5 | | −34.3 | |
| Pad wear | Wear amount (mm) | | 0.78 | | 0.65 | | 1.29 | | 1.00 | |
|  | Uneven wear amount in the diameter direction (mm) | | 0.28 | | 0.35 | | 0.42 | | 0.31 | |

TABLE 5

|  |  | Example 8 | | Example 9 | | Example 10 | | Example 11 | |
| --- | --- | --- | --- | --- | --- | --- | --- | --- | --- |
| | Kinds of powder | Average particle size (μm) | Mixing ratio (vol %) | Average particle size (μm) | Mixing ratio (vol %) | Average particle size (μm) | Mixing ratio (vol %) | Average particle size (μm) | Mixing ratio (vol %) |
| Metal matrix | Nickel | **1 | 30.1 | **1 | 36.5 | **1 | 30.0 | **1 | 20.5 |
| | Iron | **1 | 0.9 | **1 | 1.1 | **1 | 0.9 | **1 | 0.6 |
| Solid lubricant | Graphite (artificial) | 500 | 30.5 | 500 | 27.6 | 500 | 30.6 | 500 | 34.9 |
| | Graphite (natural) | 300 | 7.6 | 300 | 6.9 | 300 | 7.5 | 300 | 8.7 |
| | Calcium fluoride | 150 | 5.5 | 150 | 5.0 | 150 | 5.5 | 150 | 6.3 |
| Friction adjusting material | Tungsten (metal particles) | 80 | 4.3 | 100 | 3.9 | — | 0 | 100 | 4.9 |
| | ferro-tungsten (alloy particles) | — | 0 | — | 0 | 100 | 4.3 | — | 0 |
| | Inorganic particles Silica | 400 | 8.8 | 400 | 8.0 | 400 | 8.9 | 400 | 10.1 |
| | Mullite | 250 | 7.3 | 250 | 6.6 | 250 | 7.4 | 250 | 8.4 |
| | Zirconium silicate | 125 | 4.9 | 125 | 4.4 | 125 | 4.9 | 125 | 5.6 |
| $d_c/d_{b2}$ *1 | | | 1.25 | | 1.25 | | 1.25 | | 1.25 |
| $v_L/v$ *2 | | | 0.79 | | 0.79 | | 0.79 | | 0.79 |
| Porosity (vol %) *3 | | | 11.4 | | 4.6 | | 9.3 | | 13.6 |

*1 An average particle size ratio of an average particle size $d_c$ of graphite (when graphite includes two or more kinds of graphite different in average particle size, $d_c$ represents an average particle size of graphite having a largest average particle size) to an average particle size $d_{b2}$ of inorganic particles (when inorganic particles include two or more kinds of inorganic particles different in average particle size, $d_{b2}$ represents an average particle size of inorganic particles having a largest average particle size)
*2 A volume ratio of a total volume $v_L$ of powder particles having an average particle size of 200 μm or more among powder particles in a friction adjusting material and a solid lubricant to a total volume v of a friction adjusting material and a solid lubricant
*3 Porosity is defined from the oil content of a wear material.
**1 Powder having a particle size of less than 10 μm

TABLE 6

|  |  | | Example 8 | | Example 9 | | Example 10 | | Example 11 | |
| --- | --- | --- | --- | --- | --- | --- | --- | --- | --- | --- |
| | | | Pad temperature (° C.) | Average friction coefficient | Pad temperature (° C.) | Average friction coefficient | Pad temperature (° C.) | Average friction coefficient | Pad temperature (° C.) | Average friction coefficient |
| Average friction coefficient | Pad temperature before braking | 100° C. #1 | 360 | 0.45 | 342 | 0.45 | 322 | 0.58 | 295 | 0.65 |
| | | 200° C. #2 | 425 | 0.53 | 413 | 0.56 | 382 | 0.63 | 362 | 0.63 |
| | | 300° C. #3 | 494 | 0.61 | 494 | 0.59 | 465 | 0.69 | 436 | 0.64 |
| | | 400° C. #4 | 543 | 0.65 | 553 | 0.61 | 540 | 0.65 | 508 | 0.58 |
| | | 500° C. #5 | 611 | 0.62 | 617 | 0.59 | 642 | 0.61 | 591 | 0.51 |
| | Average value of average friction coefficients of #1 to #5 | | — | 0.57 | — | 0.56 | — | 0.63 | — | 0.60 |
| Reduction degree of the friction coefficient at high temperature | Reduction amount of the average friction coefficient from 100° C. to 500° C. of the pad temperature before braking | | | −0.17 | | −0.14 | | −0.02 | | 0.15 |
| | Reduction rate (%) of the average friction coefficient from 100° C. to 500° C. of the pad temperature before braking | | | −37.3 | | −30.4 | | −3.9 | | 22.4 |
| Pad wear | Wear amount (mm) | | | 0.98 | | 1.12 | | 0.92 | | 1.17 |
| | Uneven wear amount in the diameter direction (mm) | | | 0.35 | | 0.33 | | 0.25 | | 0.11 |

The invention claimed is:

1. A sintered friction material for brake comprising: Ni or a metal matrix consisting of Ni and less than 10 vol % Fe; a solid lubricant; and a friction adjusting material, wherein the friction adjusting material includes:
   metal or alloy particles having a first average particle size of 50 μm or more and containing at least one selected from W, Mo, Cr, and FeW; and
   inorganic particles having a second average particle size and containing at least one selected from oxides, nitrides, carbides, and intermetallic compounds, and wherein
   the first average particle size is less than the second average particle size.

2. The sintered friction material for brake according to claim 1, wherein the inorganic particles include two or more kinds of inorganic particles different in average particle size.

3. A brake pad comprising the sintered friction material according to claim 2.

4. The sintered friction material for brake according to claim 1, wherein the content of the friction adjusting material is 20 vol % to 50 vol % and the content of the metal or alloy particles included in the friction adjusting material is 1 vol % or more.

5. A brake pad comprising the sintered friction material according to claim 4.

6. The sintered friction material for brake according to claim 1, wherein
   the solid lubricant contains graphite or graphite and $CaF_2$,
   the graphite has a third average particle size of 100 μm to 900 μm, where when the graphite includes two or more kinds of graphite different in average particle size, the third average particle size represents an average particle size of graphite having a largest average particle size, a ratio of the third average particle size to the second average particle size is 1.3 or less, where when the graphite includes two or more kinds of graphite different in average particle size, the third average particle size represents an average particle size of graphite having a largest average particle size, and when the inorganic particles include two or more kinds of inorganic particles different in average particle size, the second average particle size represents an average particle size of inorganic particles having a largest average particle size, and the content of the solid lubricant is 30 vol % to 50 vol %.

7. A brake pad comprising the sintered friction material according to claim 6.

8. The sintered friction material for brake according to claim 1, wherein when the metal or alloy particles include a single group of particles or two or more groups of particles different in average particle size, the inorganic particles include a single group of particles or two or more groups of particles different in average particle size, and the solid lubricant includes a single group of particles or two or more groups of particles different in average particle size, the sintered friction material has a volume ratio of $v_L/v$ of 0.5 to 0.9, where $v_L$ represents a total volume of particles having an average particle size of 200 μm or more among the single or two or more groups of particles in the metal or alloy particles, the inorganic particles, and the solid lubricant, and v represents a total volume of the metal or alloy particles, the inorganic particles, and the solid lubricant.

9. A brake pad comprising the sintered friction material according to claim 8.

10. The sintered friction material for brake according to claim 1, wherein the inorganic particles included in the friction adjusting material have Mohs hardness of less than 9.

11. A brake pad comprising the sintered friction material according to claim 10.

12. A brake pad comprising the sintered friction material according to claim 1.

13. The sintered friction material for brake according to claim 1, wherein the solid lubricant contains graphite or graphite and $CaF_2$, the graphite has a third average particle size of 100 μm to 900 μm, where when the graphite includes two or more kinds of graphite different in average particle size, the third average particle size represents an average particle size of graphite having a largest average particle size, and a ratio of the third average particle size to the second average particle size is 1.3 or less, where when the graphite includes two or more kinds of graphite different in average particle size, the third average particle size represents an average particle size of graphite having a largest average particle size, and when the inorganic particles include two or more kinds of inorganic particles different in average particle size, the second average particle size represents an average particle size of inorganic particles having a largest average particle size.

14. The sintered friction material for brake according to claim 1, wherein the content of the solid lubricant is 30 vol % to 50 vol %.

15. The sintered friction material for brake according to claim 1, wherein the sintered friction material is applied to a brake pad of a racing motorcycle.

* * * * *